(12) United States Patent
Yasuda

(10) Patent No.: US 7,390,546 B2
(45) Date of Patent: Jun. 24, 2008

(54) OPTICAL RECORDING MEDIUM

(75) Inventor: Koichi Yasuda, Tokyo (JP)

(73) Assignee: Sony Corporation, Tokyo (JP)

(*) Notice: Subject to any disclaimer, the term of this patent is extended or adjusted under 35 U.S.C. 154(b) by 614 days.

(21) Appl. No.: 10/488,725

(22) PCT Filed: Jul. 4, 2003

(86) PCT No.: PCT/JP03/08538

§ 371 (c)(1),
(2), (4) Date: Sep. 13, 2004

(87) PCT Pub. No.: WO2004/005041

PCT Pub. Date: Jan. 15, 2004

(65) Prior Publication Data

US 2006/0246251 A1 Nov. 2, 2006

(30) Foreign Application Priority Data

Jul. 9, 2002 (JP) ............................. 2002-200376
Jan. 27, 2003 (JP) ............................. 2003-017877

(51) Int. Cl.
*B32B 3/02* (2006.01)

(52) U.S. Cl. ................... 428/64.1; 428/64.4; 428/64.5; 430/270.12; 430/270.13

(58) Field of Classification Search ............... 428/64.1, 428/64.4, 64.5; 430/270.12, 270.13
See application file for complete search history.

(56) References Cited

U.S. PATENT DOCUMENTS

| | | | | |
|---|---|---|---|---|
| 4,647,947 A | * | 3/1987 | Takeoka et al. | 346/135.1 |
| 5,034,255 A | * | 7/1991 | Shigematsu et al. | 428/64.6 |
| 5,192,626 A | * | 3/1993 | Sekiya et al. | 428/824.5 |
| 5,974,025 A | * | 10/1999 | Yamada et al. | 396/288 |
| 6,432,502 B1 | | 8/2002 | Kitaura et al. | |
| 6,605,330 B2 | * | 8/2003 | Tyan et al. | 428/64.1 |
| 6,713,148 B1 | * | 3/2004 | Hsu et al. | 428/64.1 |
| 6,723,410 B2 | * | 4/2004 | Ohno et al. | 428/64.1 |
| 7,009,930 B1 | * | 3/2006 | Uno et al. | 369/275.2 |
| 2005/0018593 A1 | * | 1/2005 | Doi et al. | 369/275.2 |
| 2006/0092819 A1 | * | 5/2006 | Yeh et al. | 369/275.1 |
| 2006/0120262 A1 | * | 6/2006 | Kiyono | 369/275.3 |

FOREIGN PATENT DOCUMENTS

| | | | |
|---|---|---|---|
| JP | 60-131650 A | | 7/1985 |
| JP | 61-31288 A | | 2/1986 |
| JP | 63-299984 | * | 12/1988 |
| JP | 05-212967 | * | 8/1993 |
| JP | 05-212967 A | | 8/1993 |
| JP | 2001-273673 A | | 10/2001 |

* cited by examiner

*Primary Examiner*—Elizabeth Mulvaney
(74) *Attorney, Agent, or Firm*—Robert J. Depke; Rockey, Depke & Lyons, LLC.

(57) ABSTRACT

An optical recording medium includes a substrate 11 with a concave and convex shape for dividing a track area formed on its surface, an optical recording layer 12 having a compound consisting of at least tin (Sn), nitrogen (N) and oxygen (O) formed on the surface in which the concave and convex shape is formed and a light transmission layer 13 formed on this optical recording layer 12.

Then, a compound composition $Sn_xN_yO_z$ of tin (Sn) nitrogen (N) and oxygen (O) comprising the optical recording layer 12 is selected so as to satisfy 30<x<70 (atomic %), 1<y<20 (atomic %) and 20<z<60 (atomic %).

According to this arrangement, the optical recording medium can improve jitter caused when Sn is used as a recording material.

15 Claims, 5 Drawing Sheets

OPTICAL RECORDING MEDIUM

This application claims priority to Japanese Patent Application Number JP2002-200376, filed Jul. 9, 2002, and Japanese Patent Application Number JP2003-017877, filed Jan. 27, 2003 which are incorporated herein by reference.

TECHNICAL FIELD

The present invention relates to an optical recording medium, and particularly to an optical recording medium capable of recording information at high recording density.

BACKGROUND ART

In recent years, researches and developments concerning optical information recording systems have been made actively in the field of information recording.

This optical information recording system has many advantages in which it can cope with various types of memories such as non-contact type recording and reproducing memories, read-only memories, write-once memories and rewritable memories, and hence a wide use from an industrial use to a consumer use of such system has been considered as a system that can realize inexpensive mass-storage files.

Increase of storage capacity of optical recording medium, for example, optical disc for use with various kinds of information recording systems has been realized mainly by reducing a wavelength of laser light serving as a light source for use in an optical recording medium and by adopting an objective lens with a high numerical aperture (N. A.) to decrease a size of a beam spot on a focus surface.

While a CD (compact disc) affords a storage capacity of 650 MB when it uses laser light with a wavelength of 780 nm and an objective lens having a numerical aperture (N. A.) of 0.45, a DVD-ROM (digital versatile disc read-only memory) affords a storage capacity of 4.7 GB when it uses laser light with a wavelength of 650 nm and an objective lens having a numerical aperture N. A. of 0.6.

Further, a next-generation optical system uses an optical disc with a thin light transmission layer having a thickness of about 0.1 mm formed on an optical recording layer and allows laser light to be irradiated thereon from the side of this light transmission layer so that a large storage capacity of greater than 22 GB can be realized by laser light having a wavelength less than 450 nm and an objective lens with a numerical aperture N. A. of 0.78 or more.

FIG. 6(a) is a schematic perspective view showing optical recording state or optical reproducing state in this optical disc.

An optical disc DC is shaped like a disk with a center hole CH bored at its center portion, and is rotated in the direction shown by an arrow DR, for example, in FIG. 6(a).

FIG. 6(b) is a schematic cross-sectional view of the optical disc. FIG. 6(C) is an enlarged cross-sectional view of a main portion of this optical disc DC.

This optical disc has a disc substrate 101 having a thickness of about 1.1 mm made of polycarbonate, for example, a concave portion 101r formed on one major surface of the disc substrate and an optical recording layer 102 formed along a concave and convex surface including the concave portion 101r.

In a phase-change type optical disc DC, for example, its optical recording layer 102 is comprised of a laminated layer material consisting of a dielectric film, a phase-change film, a dielectric film and a reflective film and the like, for example.

A light transmission layer 103 having a thickness of 0.1 mm, for example, is formed on the optical recording layer 102.

When information is recorded on or reproduced from this optical disc DC, light LT of laser light having a wavelength not more than 450 nm, for example, in a range from 380 nm to 420 nm is focused and irradiated on the optical recording layer 102 from the side of the light transmission layer 103 of the optical disc DC by an objective lens having a numerical aperture not lower than 0.78, for example, 0.85.

When recorded information is reproduced from this optical disc, a light-receiving element receives returned light reflected on the optical recording layer 102 and a signal processing circuit generates a predetermined signal to obtain a reproduced signal.

The optical recording layer 102 of this optical disc has a concave and convex-like shape caused by the above-mentioned concave portion 101r formed on the surface of the disc substrate 101.

The concave portion 101r is formed as a continuous groove or a circular groove shaped like a spiral, for example, at a predetermined pitch, and the track area is divided by the concave and convex shape.

A concave portion and a convex portion of the concave and convex shape, which divides this track area, are generally referred to as a "land" and a "groove". An optical disc can increase its storage capacity with application of a land and groove recording system for recording information both on the land and the groove. Moreover, only one of the land and the groove can be formed as a recording area.

The concave and convex shape caused by the concave portion 101r formed on the disc substrate 101 is formed as a pit having a length corresponding to recorded data so that the optical disc can be formed as a read-only memory (ROM) type optical disc.

It has been reported that tin oxide ($SnO_z$, z<2) of metal oxide having a nonstoichiometric composition can be used as a recording material comprising an optical recording layer (for example see Journal of Materials Science Letters 19, 2000, 1833 to 1835).

It may be considered that this technology uses a phenomenon in which an optical constant of a light irradiated portion of an optical recording layer changes due to oxidation reaction caused when the optical recording layer is irradiated with light such as laser light.

However, when tin (Sn) is used as the recording material, if information is recorded on the optical disc by using an objective lens having a numerical aperture of about 0.8 to focus short-wavelength laser light having a wavelength ranging from about 380 nm to 420 nm on the optical disc, then a problem arises, in which recording marks of satisfactory shape cannot be formed so that jitter increases.

DISCLOSURE OF THE INVENTION

A first object of the present invention is to improve the above-mentioned jitter when Sn is used as a recording material and a second object of the present invention is to provide an optical recording medium capable of stabilizing recording characteristics and improving stability of shelf life under high temperature and high humidity so that the optical recording medium is able to record information satisfactorily.

An optical recording medium according to the present invention comprises a substrate with a concave and convex shape for dividing a track area formed on its surface, at least an optical recording layer formed on a surface in which the concave and convex shape is formed and a light transmission layer formed on the optical recording layer, wherein the optical recording layer is composed of a composition $Sn_xN_yO_z$ (x, y, z are atomic %) of a compound of at least tin (Sn), nitrogen (N) and oxygen (O), x, y, z being selected so as to satisfy 30<x<70 (atomic %), 1<y<20 (atomic %) and 20<z<60 (atomic %).

With this arrangement, the optical recording medium could improve jitter.

Further, an optical recording medium according to the present invention comprises a substrate with a concave and convex shape for dividing a track area formed on its surface, at least an optical recording layer formed on a surface in which the concave and convex shape is formed and a light transmission layer formed on the optical recording layer, wherein the optical recording layer is composed of composition $(Sn_xN_yO_z)_{1-a}Pd_a$ (x, y, z, a are atomic %) containing palladium (Pd) in a compound of tin (Sn), nitrogen (N) and oxygen (O), x, y, z, a being selected so as to satisfy 30<x<70 (atomic %), 1<y<20 (atomic %), 20<z<60 (atomic %) and 1<a<20 (atomic %).

According to this arrangement, not only jitter could be improved but also change of recording characteristics could be suppressed, in particular, under high temperature and high humidity. The reason for this may be considered that viscosity of a recording film fused upon recording could be increased by addition of Pd.

BEST MODE FOR CARRYING OUT THE INVENTION

An optical disc of an optical recording medium according to embodiments of the present invention will be described below in detail. However, the present invention is not limited to those embodiments.

First Embodiment

Figure 1A:
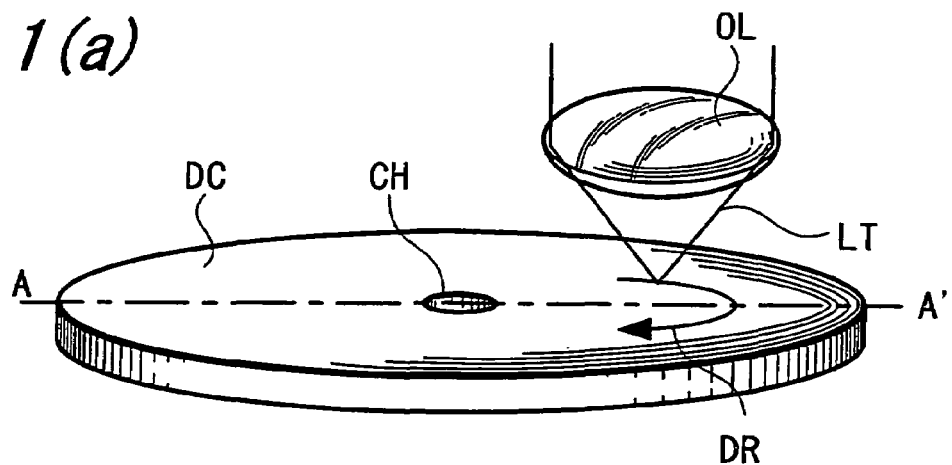
FIG. 1(a) is a schematic perspective view showing the manner in which light is irradiated on an optical disc according to an embodiment of the present invention.

FIG. 1(a) is a schematic perspective view showing the state in which information is recorded on or reproduced from an optical disc DC according to this embodiment with irradiation of light.

The optical disc DC is shaped like a disk with a center hole CH bored thereon and is rotated in the direction shown by an arrow DR, for example, in FIG. 1(a).

Figure 1B:
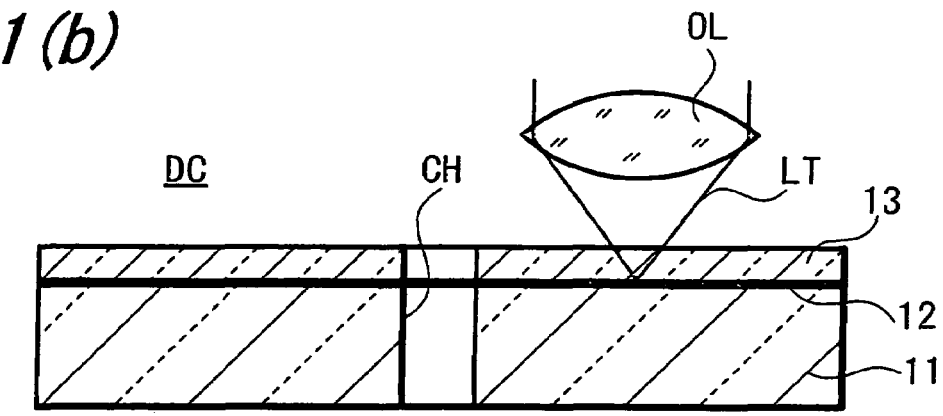
FIG. 1(b) is a schematic cross-sectional view taken along the line A-A' in FIG. 1(a)
Figure 1C:
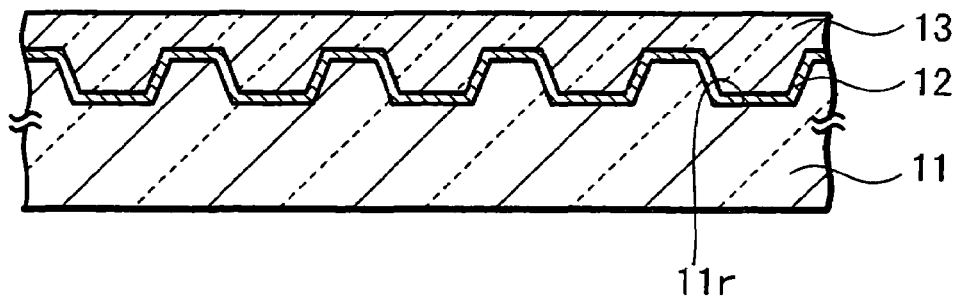
FIG. 1(c) is a cross-sectional view showing a main portion in an enlarged-scale.

FIG. 1(b) is a schematic cross-sectional view of this optical disc DC, and FIG. 1(c) is a cross-sectional view showing a main portion of FIG. 1(b) in an enlarged-scale.

The optical disc DC is shaped like the disk having the center hole CH and a concave portion 11r is formed on one major surface of a disc substrate 11 having a thickness of about 1.1 mm made of polycarbonate, for example. An optical recording layer 12 is formed along concave and convex portions including this concave portion 11r, and a light transmission layer 13 is formed on this optical recording layer 12.

The optical recording layer 12 includes a compound of at least tin (Sn), nitrogen (N) and oxygen (O).

A composition $Sn_xN_yO_z$ of this compound is selected so as to satisfy 30<x<70 (atomic %), 1<y<20 (atomic %) and 20<z<60 (atomic %).

The optical recording layer 12 has a film thickness ranging from 10 nm to 200 nm, for example, approximately 30 nm to 60 nm.

The light transmission layer 13 on the optical recording layer 12 has a thickness of 0.1 mm, for example. The light transmission layer 13 is formed by curing a coated film of ultraviolet-curing resin, for example. Alternatively, the light transmission layer is constructed by attaching a light transmission resin film made of a suitable material such as polycarbonate with an adhesive layer laminated thereon to the optical recording layer 12 through the adhesive layer.

When information is recorded on or reproduced from the optical disc DC according to this embodiment, this disc DC is rotated in the direction shown by an arrow DR shown in FIG. 1(a), for example, and information is recorded on and reproduced from the optical recoding layer 12 of the optical disc DC, for example, by focusing and irradiating laser light LT with a wavelength ranging from 380 nm to 420 nm, for example, from the side of the light transmission layer 13 to the optical recording layer 12 through an objective lens OL having a numerical aperture of 0.85±0.05, for example.

When information is recorded on the optical disc, the above-mentioned laser light LT, for example, is irradiated on the optical recording layer 12 and thereby a recording mark is formed on the light irradiated portion. It may be considered that this recording mark is formed when an optical constant of the light irradiated portion of the optical recording layer 12 changes due to oxidation reaction caused by irradiation of the above-mentioned laser light LT.

When information is reproduced from the optical disc, reflected light, for example, modulated by change of the optical constant in the recording mark after laser light has been irradiated on the optical recording layer 12 is received by a light-receiving element, it is generated as a predetermined signal by a signal processing circuit and is thereby outputted as a reproduced signal.

In this optical disc, the optical recording layer 12 has a concave and convex shape caused by the concave portion 11r formed on the surface of the disc substrate 11.

For example, the concave portion 11r formed on the disc substrate 11 is shaped like a spiral of a predetermined pitch, that is, a spiral-like continuous groove or a concentric circle-like groove, and the track area is divided by this concave and convex shape.

A pitch (distance from the center of the concave portion to the center of the adjacent concave portion) of this continuous groove or concentric circle-like groove, for example, is approximately 0.32 μm, for example.

A convex portion and a concave portion of the concave and convex shape that divides the track area are generally referred to as a "land" and a "groove". Then, the optical disc can increase its storage capacity with application of a land and groove recording system by which information is recorded on both of the land and the groove. However, only one of the land and the groove can be formed as the recording area.

This concave and convex shape has a depth ranging from about several nanometers to 100 nm. In the case of the groove recording system, the depth of this concave and convex shape can be set to 20 nm. In the case of the land and groove recording system, the depth of this concave and convex shape can be set to 40 nm and so on.

When tin oxide ($SnO_z$ ($z<2$)) is used as a recording material, it is to be understood from experiments of X-ray diffraction that particles of a certain particle size exist in the film. Since the particles contribute to a noise component generated when the recording material is used to form the optical disc, when a numerical aperture of an objective lens is increased and a wavelength of laser light is reduced in order to increase the storage capacity of the optical disc, influence exerted by particles become serious, and hence jitter increases.

In the optical disc according to this embodiment, it was to be understood that a peak of X-ray diffraction was lost by addition of at least a compound of tin, nitrogen and oxygen, that is, nitrogen (N) as a recording material. This indicates that the particle size of particles in the optical recording film decreased.

Since the particle size of the particles decreased as described above, particle influence that causes a noise component decreases so that jitter can be suppressed in this optical disc even when the numerical aperture of the objective lens is increased and the wavelength of laser light is reduced.

In the composition of the compound of tin (Sn), nitrogen (N) and oxygen (O) used as the optical recording layer in this optical disc, the composition ratio y of nitrogen (N) is selected so as to satisfy $1<y<20$ (atomic %).

The reason for this is that if the composition ratio of nitrogen is not more than 1 atomic %, then effect for reducing a particle size is decreased. If it is not less than 20 atomic %, then light absorption ratio of the optical recording layer is lowered so that, when laser light is irradiated on the optical recording medium, light of intensity high enough to cause temperature to rise to change the optical constant is required, that is, sensitivity is lowered.

A composition ratio z of oxygen (O) in the above-mentioned compound is selected so as to satisfy $20<z<60$.

The reason for this is that if the composition ratio of oxygen is not more than 20 atomic %, then oxygen runs short and that if it is not less than 60 atomic %, then light absorption ratio of the optical recording layer is lowered so that, when laser light is irradiated on the optical recording medium, light of intensity high enough to cause temperature to rise to change the optical constant is required, that is, sensitivity is lowered.

As described above, when the compound of nitrogen (N) is used as the optical recording layer according to the present invention, in the composition $Sn_xN_yO_z$ of the compound of tin (Sn), nitrogen (N) and oxygen (O) is selected so as to satisfy $30<x<70$ (atomic %), $1<y<20$ (atomic %) and $20<z<60$ (atomic %).

According to this composition, even when the numerical aperture of the objective lens is increased and the wavelength of the laser light is reduced, effect for suppressing jitter can be increased.

Next, an optical disc manufacturing method according to this embodiment will be described.

Figure 2A:
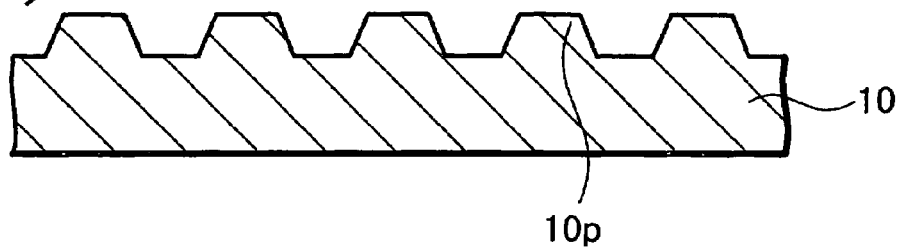
FIGS. 2(a) to 2(d) are cross-sectional views showing manufacturing processes of a manufacturing method of an optical disc according to an embodiment.

First, as shown in FIG. 2(a), there is formed a stamper 10 for transferring the concave and convex shape on the disc substrate. Specifically, a convex portion 10p that is the inverted pattern of the concave portion 11r of the disc substrate 11 shown in FIG. 1(c) is formed on the surface of this stamper 10.

This stamper 10 can be obtained by the following method.

First, by a suitable method such as spin-coat, a positive-type photoresist, for example, is coated on the glass substrate at its smooth surface of which surface was polished. A pattern with a shape corresponding to the concave and convex shape of the disc substrate, such as a desired spiral shape or concentric circle shape, is exposed on this photoresist layer by laser light, and then this photoresist layer is developed by alkaline developer, for example. In this manner, there is obtained a master on which there is formed a resist film with a pattern corresponding to the pattern of the concave and convex shape of the disc substrate formed by the patterned photoresist layer.

Next, a metal layer made of a suitable material such as nickel is deposited on this master by nonelectrolytic plating and plating so as to have a predetermined thickness. Thereafter, this metal layer is released from the master. In this manner, there is formed a stamper 10 made of the plated layer with the concave and convex shape formed by the inverted concave and convex shape of the above-mentioned master or there is formed the desired stamper 10 by repeating transfer of those stampers after a master stamper and a mother stamper have been formed.

Figure 2B:
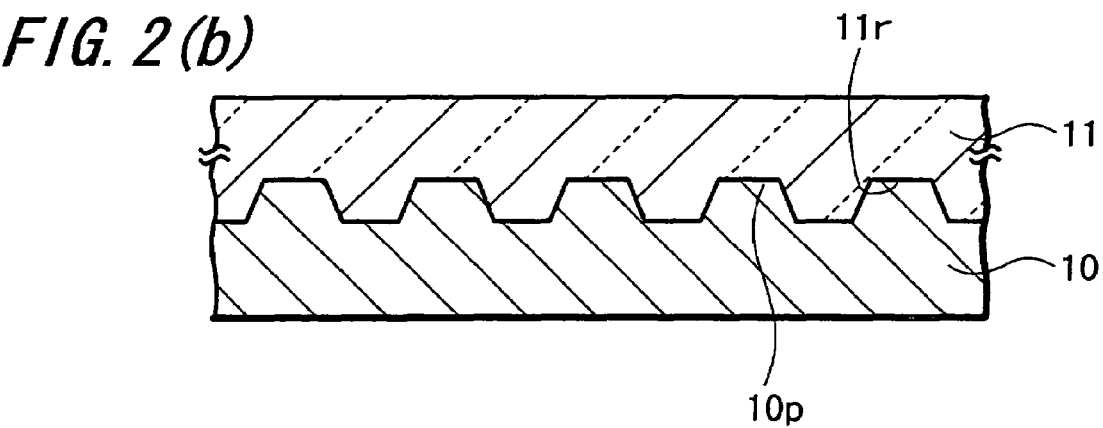

Next, this stamper 10 is disposed within a cavity of a metal mold for molding the disc substrate 11, for example, by injection molding, and molded by injection molding of polycarbonate (PC), for example. In this manner, as shown in FIG. 2(b), the disc substrate 11 is formed on the concave and convex surface of the stamper 10.

As described above, there is molded the disc substrate 11 with the concave portion 11r, which is the inverted concave and convex pattern, formed on the surface by transfer of the convex portion 10p of the stamper 10.

Figure 2C:
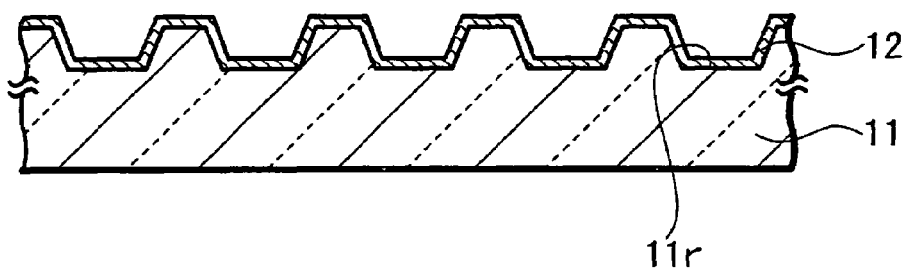

The thus molded disc substrate 11 is released from the stamper 10 and dusts are removed from the concave and convex formed surface by blasting gas such as air or nitrogen gas. Thereafter, as shown in FIG. 2(c), a compound layer with a predetermined composition ratio of tin (Sn), nitrogen (N) and oxygen (O) is deposited on the concave and convex surface by a sputtering method, for example, to form the optical recording layer 12.

Figure 2D:
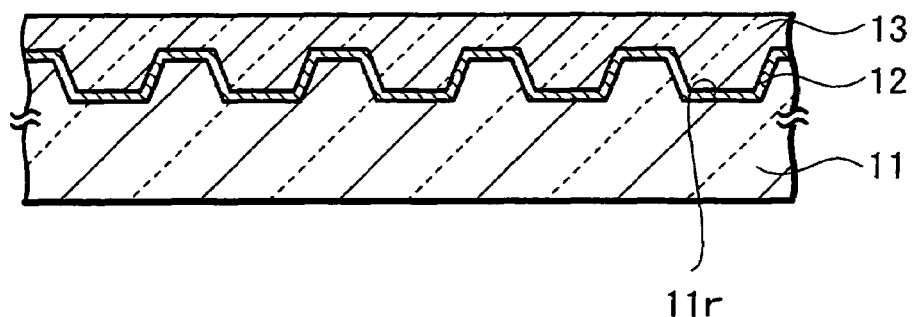

Next, as shown in FIG. 2(d), the light transmission layer 13 is formed on the optical recording layer 12 by curing a light transmission resin material such as ultraviolet-curing resin coated on the optical recording layer. Alternatively, the light transmission layer is formed by bonding a light transmission resin film made of a suitable material such as polycarbonate to the optical recording layer through an adhesive layer.

In this manner, the optical disc DC having the arrangement shown in FIG. 1(a) could be manufactured.

When information was recorded on the inventive optical disc DC by using an objective lens with a large numerical aperture with irradiation of laser light having a short wavelength, jitter could be suppressed and information could be recorded on this optical disc satisfactorily.

Next, a second embodiment of an optical recording medium according to the present invention will be described.

This second embodiment has an arrangement to remove a risk that the above-mentioned adhesive layer comprising the light transmission layer 13 will be denatured when temperature of the recording layer is raised and the recording layer is heated with irradiation of laser light to record information, that is, to form recording marks on the optical recording medium.

Second Embodiment

Figure 3:
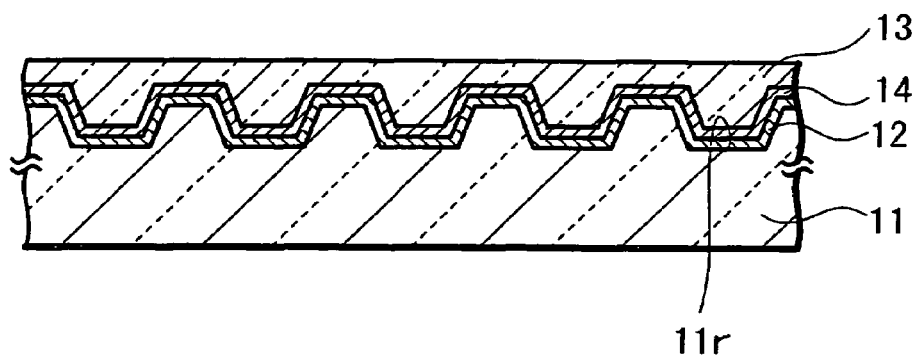
FIG. 3 is a schematic cross-sectional view of an optical disc according to an embodiment of the present invention.

FIG. 3 is a schematic cross-sectional view of an optical disc according to this embodiment.

An optical disc according to this embodiment is substantially similar to the above-mentioned optical disc according to the first embodiment and has an arrangement in which a protective film 14 for protecting the optical recording layer 12 is interposed between the optical recording layer and the light transmission layer 13.

Also in this embodiment, the concave portion 11r is formed on one major surface of the disc substrate 11 made of polycarbonate, for example, having a thickness of approximately 1.1 mm, for example. Also, the optical recording layer 12 is formed on the concave and convex surface including the concave portion 11r.

Also in this embodiment, similarly to the first embodiment, the optical recording layer 12 has a compound of at least tin (Sn), nitrogen (N) and oxygen (O). This compound composition $Sn_xN_yO_z$ of the compositions of tin (Sn), nitrogen (N) and oxygen (O) should preferably be selected so as to satisfy 30<x<70 (atomic %), 1<y<20 (atomic %) and 20<z<60 (atomic %).

This optical recording layer 12 has a thickness ranging from 10 nm to 200 nm, in this case, in a range from approximately 50 nm to 60 nm, for example.

In this embodiment, this optical recording layer 12 has deposited thereon the protective film 14 made of a light transmission dielectric film such as silicon oxide, for example.

This protective film 14 has a thickness ranging from 5 nm to 100 nm, for example, 30 nm.

The light transmission layer 13 having a thickness of 0.1 mm, for example, is deposited on this protective film 14. This light transmission layer 13 is constructed in such a manner that a light transmission resin film made of a suitable material such as polycarbonate with an adhesive layer, for example, laminated thereon is bonded to the protective film 14 by the adhesive layer.

According to the arrangement for interposing the protective film 14 between the optical recording layer and the light transmission layer as seen in this embodiment, even when the optical disc is brought to the high temperature state with irradiation of laser light to form recording marks, since the protective film 14 is interposed between the optical recording layer and the light transmission layer, the adhesive layer in the light transmission layer 13 can be prevented from being denatured to thereby protect the optical recording layer 12 from being affected.

Next, an optical disc manufacturing method according to the second embodiment will be described.

Figure 4A:
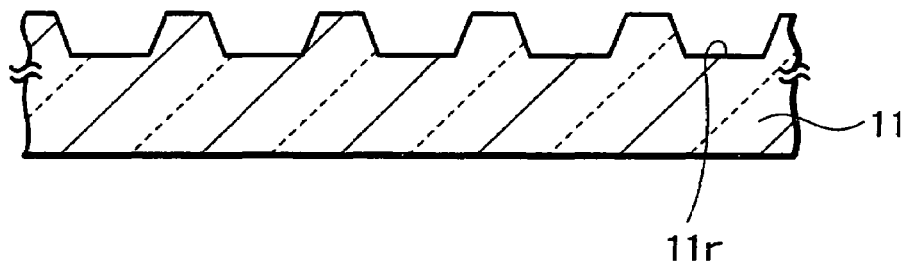
FIGS. 4(a) and 4(b) are manufacturing process diagrams of an optical disc manufacturing method according to an embodiment of the present invention.

First, as shown in FIG. 4(a), according to the procedure described in the first embodiment, there is formed the disc substrate 11 with the concave and convex shape including the concave portion 11r for dividing the track area formed on the surface thereof.

Figure 4B:
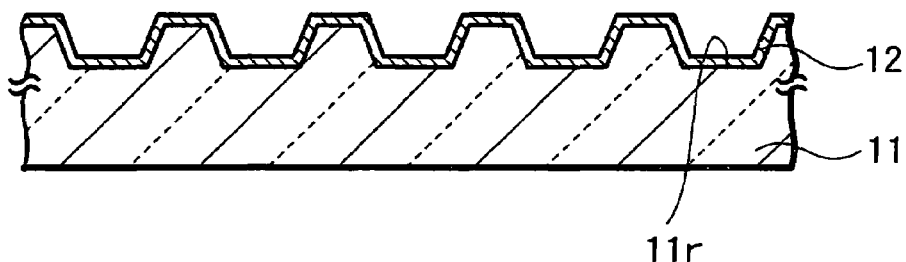

Next, after dusts have been removed from this disc substrate 11 on its concave and convex shape formed surface by blasting gas such as air and nitrogen gas onto the above surface, the optical recording layer 12 of the above-mentioned composition consisting of the compound of tin, nitrogen and oxygen is formed by a suitable method such as a sputtering method as shown in FIG. 4(b).

Figure 5A:
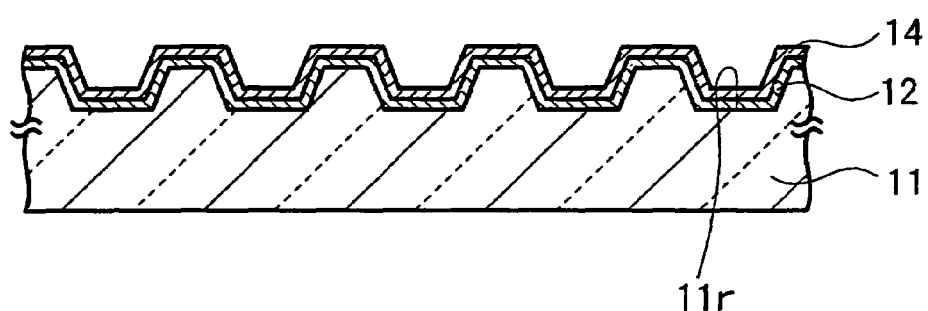
FIGS. 5(a) and 5(b) are manufacturing process diagrams.

Next, as shown in FIG. 5(a), silicon oxide is deposited by a suitable method such as a sputtering method to thereby form the protective film 14.

Figure 5B:
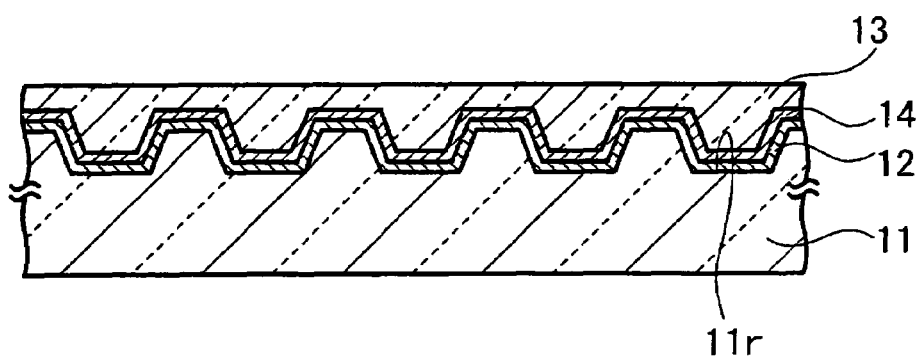
Figure 6A:
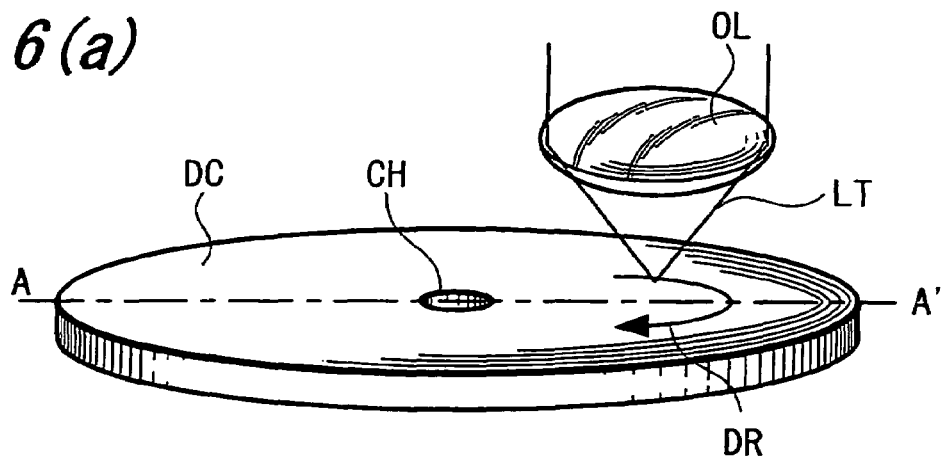
FIG. 6(a) is a schematic perspective view showing the manner in which light is irradiated on an optical disc according to an example of the prior art.
Figure 6B:
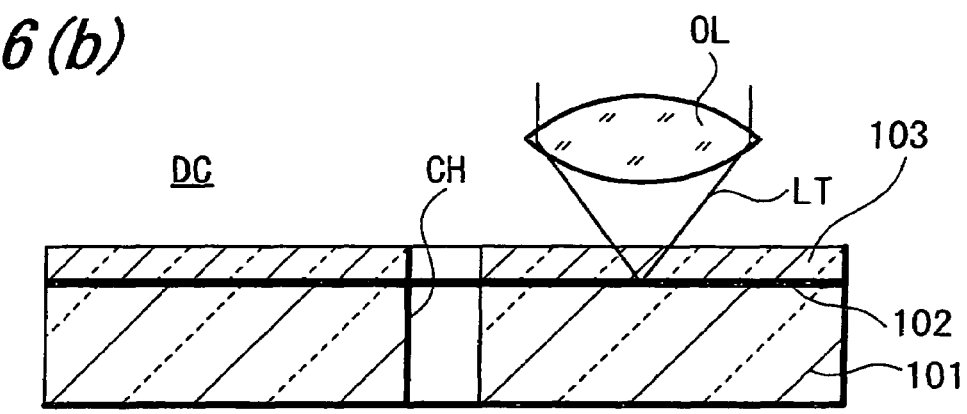
FIG. 6(b) is a schematic cross-sectional view taken along the line A-A' in FIG. 6(a)
Figure 6C:
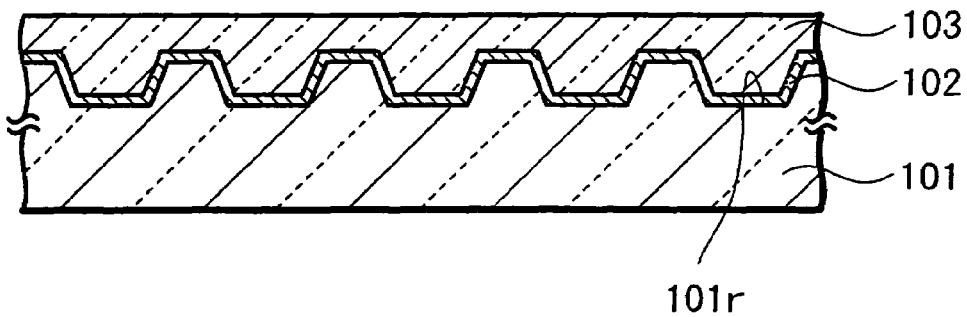
FIG. 6(c) is a cross-sectional view showing a main portion in an enlarged-scale.

Thereafter, as shown in FIG. 5(b), the light transmission layer 13 is formed by bonding the light transmission resin film made of a suitable material such as polycarbonate onto the protective film 14 with the adhesive layer.

In this manner, the optical disc having the arrangement shown in FIG. 3, that is, optical recording medium can be manufactured.

According to the optical disc of this second embodiment, similarly to the first embodiment, even when information is recorded on the optical disc using tin as the recording material with irradiation of laser light having a short wavelength from an objective lens having a large numerical aperture, jitter can be suppressed, and hence information can be recorded on the optical disc satisfactorily.

The above-mentioned optical disc according to the present invention, that is, optical recording medium will be described with reference to specific inventive examples and comparative examples which are in contrast with the present invention.

Inventive Example 1

There was formed a disc substrate with a concave and convex shape to divide a track area formed on its surface. The concave and convex shape was a continuous groove formed like spirals at a pitch of 0.32 μm, and the concave and convex shape had a depth of 20 nm. A composition of $Sn_xN_yO_z$ (x=31 atomic %, y=10 atomic %, z=59 atomic %) having a thickness of 50 nm was deposited on the disc substrate at its concave and convex shape formed surface by sputtering so as to satisfy this composition ratio to thereby form an optical recording layer. Further, a protective film was formed by depositing silicon oxide having a thickness of 30 nm on the optical recording layer, and a light transmission layer having a thickness of 0.1 mm was formed by bonding a light transmission resin film made of a suitable material such as polycarbonate onto the protective film with an adhesive layer. In this manner, an optical disc sample A was manufactured.

A random signal with a bit length of 0.13 μm was recorded on this sample A with irradiation of recording and reproducing laser light having a wavelength of 405 nm from an objective lens having a numerical aperture of 0.85 by a test system having an optical system for focusing light on the optical recording layer of the optical disc.

The signal that has been recorded on the optical disc had jitter of 9%.

Comparative Example 1

This comparative example had a similar arrangement to that of the inventive example 1 but the composition of the optical recording layer was changed to $Sn_xN_yO_z$ (x=30 atomic %, y=10 atomic %, z=60 atomic %) and an optical disc sample B was manufactured.

A random signal having a bit length of 0.13 μm was recorded on this sample B by the test system described in the inventive example 1. Jitter at that time was 15%.

In general, if jitter exceeds 13%, then it is difficult to reproduce information from the optical disc at high accuracy. Therefore, the optical recording medium, for example, optical disc has requirements in which jitter should be not more than 13%.

Comparative Example 2

This comparative example had a similar arrangement to that of the inventive example 1 but the composition of the optical recording layer was changed to $Sn_xN_yO_z$ (x=25 atomic %, y=10 atomic %, z=65 atomic %) and an optical disc sample C was manufactured.

Although a random signal having a bit length of 0.13 μm was recorded on this sample C by the test system shown in the inventive example 1, a signal was not recorded on this sample, and hence jitter could not be measured.

Inventive Example 2

This inventive example had a similar arrangement to that of the inventive example 1 but the composition of the optical recording layer was changed to $Sn_xN_yO_z$ (x=69 atomic %, y=10 atomic %, z=21 atomic %) and an optical disc sample D was manufactured.

A random signal having a bit length of 0.13 μm was recorded on this sample D by the test system described in the inventive example 1. Jitter at that time was 10%.

Comparative Example 3

This comparative example had a similar arrangement to that of the inventive example 1 but the composition of the optical recording layer was changed to $Sn_xN_yO_z$ (x=70 atomic %, y=10 atomic %, z=20 atomic %) and an optical disc sample E was manufactured.

A random signal having a bit length of 0.13 μm was recorded on this sample E by the test system described in the inventive example 1. Jitter at that time was 16%. This jitter exceeds 13%, and hence it was to be understood that this comparative example is not suitable for the application to the optical disc.

Comparative Example 4

This comparative example had a similar arrangement to that of the inventive example 1 but the composition of the optical recording layer was changed to $Sn_xN_yO_z$ (x=75 atomic %, y=10 atomic %, z=15 atomic %) and an optical disc sample F was manufactured.

Although a random signal having a bit length of 0.13 μm was recorded on this sample F by the test system described in the inventive example 1, no signal was recorded on this disc sample and hence jitter could not be measured.

Inventive Example 3

This inventive example had a similar arrangement to that of the inventive example 1 but the composition of the optical recording layer was changed to $Sn_xN_yO_z$ (x=45 atomic %, y=2 atomic %, z=53 atomic %) and an optical disc sample G was manufactured.

A random signal having a bit length of 0.13 μm was recorded on this sample G by the test system described in the inventive example 1. Jitter at that time was 10%.

Comparative Example 5

This comparative example had a similar arrangement to that of the inventive example 1 but the composition of the optical recording layer was changed to $Sn_xN_yO_z$ (x=45 atomic %, y=1 atomic %, z=54 atomic %) and an optical disc sample H was manufactured.

A random signal having a bit length of 0.13 μm was recorded on this sample H by the test system described in the inventive example 1. Jitter at that time was 14%. This jitter exceeds 13%, and hence it was to be understood that this comparative example is not suitable for the application to the optical disc.

Inventive Example 4

This inventive example had a similar arrangement to that of the inventive example 1 but the composition of the optical recording layer was changed to $Sn_xN_yO_z$ (x=45 atomic %, y=19 atomic %, z=36 atomic %) and an optical disc sample I was manufactured.

A random signal having a bit length of 0.13 μm was recorded on this sample I by the test system described in the inventive example 1. Jitter at that time was 10%.

Comparative Example 6

This comparative example had a similar arrangement to that of the inventive example 1 but the composition of the optical recording layer was changed to $Sn_xN_yO_z$ (x=45 atomic %, y=20 atomic %, z=35 atomic %) and an optical disc sample J was manufactured.

A random signal having a bit length of 0.13 μm was recorded on this sample J by the test system described in the inventive example 1. Jitter obtained at that time was 14%, which was an unsatisfactory result.

A study of measured results of jitters of the samples of the inventive examples and the comparative examples reveals that the optical recording medium having the inventive optical recording layer composed of the compound of tin (Sn), nitrogen (N) and oxygen (O), its composition $Sn_xN_yO_z$ being selected so as to satisfy 30<x<70 (atomic %), 1<y<20 (atomic %), 20<z<60 (atomic %) can improve jitter.

Specifically, although the above-mentioned first and second embodiments can improve jitter, when the optical recording layer is composed of tin oxide and tin nitride $Sn_xN_yO_z$ as in the above-mentioned embodiments, viscosity of the optical recording layer is relatively low in the state in which the optical recording layer is fused with irradiation of laser light. As a result, improvement of jitter is restricted or improvement of shelf life under high temperature and high humidity is restricted.

On the other hand, according to the present invention, there is provided an optical recording medium having high resistance against high temperature and high humidity and in which sharpness of recording marks can increase to improve jitter and stability of shelf life.

In the optical recording medium having this arrangement according to the present invention, its recording layer has an arrangement in which palladium Pd, which is a high melting point metal, of 1 atomic % to 20 atomic % is mixed into a compound of $Sn_xN_yO_z$ selected so as to satisfy 30<x<70 (atomic %), 1<y<20 (atomic %) 20<z<60 (atomic %).

Specifically, with this arrangement, when information is recorded on this optical recording medium with irradiation of laser light, viscosity obtained when the recording layer is fused can increase to improve lowered sharpness and fluctuation of position of recording marks, which can improve jitter and shelf life much more.

An embodiment of the optical recording medium having this arrangement will be described.

Third Embodiment

Also in this embodiment, similarly to the first embodiment, the optical disc DC is shaped like the disc with the center hole CH bored thereon as FIG. 1(a) shows a schematic perspective view. The disc substrate 11 having a thickness of approximately 1.1 mm made of polycarbonate, for example, has the concave portion 11r formed on its one major surface. As shown in FIGS. 1(b) and 1(c), the optical recording layer 12 is formed along concavities and convexities including this concave portion 11r, and the light transmission layer 13 is formed on this optical recording layer 12.

The optical recording layer 12 has a mixture in which palladium Pd was mixed to a compound of at least tin (Sn), nitrogen (N), oxygen (O) ($Sn_xN_yO_z$ are selected so as to satisfy 30<x<70 (atomic %), 1<y<20 (atomic %), 20<z<60 (atomic %)). Palladium Pd has a concentration which falls within a range from 1 atomic % to 20 atomic %.

Similarly to the first embodiment, the optical recording layer 12 has a film thickness ranging from 10 nm to 200 nm, for example, 30 nm to 60 nm.

The light transmission layer 13 having a thickness of 0.1 mm, for example, is formed on the optical recording layer 12. This light transmission layer 13 is formed by curing a coated film of an ultraviolet-curing resin. Alternatively, the light transmission layer is formed by bonding a light transmission resin film made of a suitable material such as polycarbonate with an adhesive layer laminated thereon to the optical recording layer 12 through the adhesive layer.

When information is recorded on or reproduced from the optical disc DC according to this embodiment, this disc DC is rotated in the direction shown by the arrow DR in FIG. 1(a) and the optical recording layer 12 of the optical disc DC, for example, is irradiated with laser light LT having a wavelength ranging from 380 nm to 420 nm, for example, and focused on the optical recording layer 12 from the side of the light transmission layer 13 through an objective lens OL having a numerical aperture of 0.85±0.05, for example.

When information is recorded on the optical disc, the above-mentioned laser light LT irradiates the optical recording layer 12 to form recording marks on the portion irradiated with the laser light. As mentioned before, this recording mark is formed when an optical constant of the light irradiated portion of the optical recording layer 12 is changed due to oxidation reaction caused by irradiation of the above-mentioned laser light LT.

When information is reproduced from the optical disc, reflected light, for example, modulated by change of the optical constant in the recording mark after laser light has been irradiated on the optical recording layer 12 is received by a light-receiving element, it is generated as a predetermined signal by a signal processing circuit and is thereby outputted as a reproduced signal.

In this optical disc, the optical recording layer 12 has concave and convex shapes caused by the concave portion 11r formed on the surface of the disc substrate 11.

For example, the concave portion 11r formed on the disc substrate is shaped like a spiral of a predetermined pitch, a spiral-like continuous groove or a concentric circle-like groove, and the track area is divided by this concave and convex shape.

A pitch (distance from the center of the concave portion to the center of the adjacent concave portion) of this continuous groove or concentric circle-like groove, for example, is approximately 0.32 μm, for example.

A convex portion and a concave portion of the concave and convex shape that divides the track area are generally referred to as a "land" and a "groove". Then, the optical disc can increase its storage capacity with application of a land and groove recording system by which information is recorded on both of the land and the groove. However, only one of the land and the groove can be formed as the recording area.

The depth of this concave and convex shape falls within a range from approximately several nanometers to 100 nm. In the case of the groove recording system, for example, the depth of the concave and convex shape can be set to 20 nm. In the case of the land and groove recording system, the depth of the concave and convex shape can be set to 40 nm.

Since the optical disc according to this embodiment uses the recording material consisting of the mixture in which Pd is mixed into the compound of at least tin, nitrogen and oxygen, viscosity obtained when the recording layer is fused can be increased and the fluctuations of the position of the recording mark and the shape of the recording mark can be suppressed, thereby increasing the recording density. Specifically, since the optical disc can increase its storage capacity, even when the numerical aperture of the objective lens is increased and the wavelength of the irradiated laser light is reduced, jitter can be suppressed. Also, recording characteristics under high temperature and high humidity can be improved, and shelf life can be stabilized.

The concentration of Pd added to the compound of tin (Sn), nitrogen (N), oxygen (O) comprising the optical recording layer in the optical disc according to this embodiment is selected in a range from 1 atomic % to 20 atomic %. If this concentration is less than 1 atomic %, then fluidity suppressing effect decreases and the above improvement of the shelf life stability becomes insufficient. If this concentration exceeds 20 atomic %, then melting point and thermal conductivity increase too much, and hence recording sensitivity is lowered.

Therefore, the concentration of Pd is selected in a range from 1 atomic % to 20 atomic %.

An optical disc manufacturing method according to this embodiment will be described.

Also in this case, the stamper 10 is formed by a similar method to that has been described with reference to FIG. 2(a). Specifically, a convex portion 10p of the inverted pattern of the concave portion 11r of the disc substrate 11 shown in FIG. 1(c) is formed on this stamper 10.

Next, this stamper 10 is disposed within the cavity of the metal mold used to mold the disc substrate 11, for example, by injection molding and thereby molded by injection molding of polycarbonate (PC). In this manner, the disc substrate 11 is formed on the concave and convex surface of the stamper 10 as shown in FIG. 2(b).

In this manner, there is formed the disc substrate 11 in which the concave portion 11r which is the concave and convex shape of the inverted pattern is formed by transferring the pattern of the convex portion 10p of the stamper 10 to the surface.

The thus molded disc substrate 11 is released from the stamper 10 and dusts are removed from the concave and convex formed surface by blasting gas such as air and nitrogen gas to the concave and convex formed surface. Thereafter, as shown in FIG. 2(c), the optical recording layer 12 is formed by depositing the material layer in which Pd of a predetermined added amount is mixed into the compound of a predetermined composition ratio of tin (Sn), nitrogen (N) and oxygen (O) according to the sputtering method, for example.

Next, as shown in FIG. 2(d), by a procedure and a method similar to those that have been described in the manufacturing method according to the aforementioned first embodiment, the light transmission layer 13 is formed on the optical recording layer 12.

In this way, the optical disc DC having the arrangement shown in FIG. 1(a) can be manufactured.

Next, a fourth embodiment will be described.

According to the fourth embodiment, the optical recording medium of the above-mentioned third embodiment may have an arrangement to prevent the above-mentioned adhesive layer comprising the light transmission layer 13 from being denatured due to rise of temperature of the recording layer heated with irradiation of laser light when information is recorded, that is, recording mark is formed.

Fourth Embodiment

An optical disc according to this embodiment has a schematic cross-section similar to that described in FIG. 3.

Although the optical disc according to this embodiment is substantially similar to the above-mentioned optical disc according to the third embodiment, the protective film 14 for protecting the optical recording layer 12 is interposed between the optical recording layer 12 and the light transmission layer 13.

Also in this case, the concave portion 11r is formed on one major surface of the disc substrate 11 having a thickness of about 1.1 mm, for example, made of polycarbonate, for example. The optical recording layer 12 is formed along the concave and convex surface including the concave portion 11r.

Also in this embodiment, similarly to the third embodiment, the optical recording layer 12 has the arrangement in which Pd of 1 to 20 atomic % is mixed into the compound of $Sn_xN_yO_z$ of which composition ratio satisfies 30<x<70 (atomic %), 1<y<20 (atomic %), 20<z<60 (atomic %).

This optical recording layer 12 has a thickness ranging from 10 nm to 200 nm, in this case, in a range from approximately 30 nm to 60 nm.

Then, also in this embodiment, the protective layer 14 made the light transmission dielectric film made of a suitable material such as silicon oxide is formed on this optical recording layer 12.

The film thickness of this protective film 14 is selected in a range from 5 nm to 100 nm, for example, 30 nm.

The light transmission layer 13 having a thickness of 0.1 mm, for example, is formed on this protective film 14. This light transmission layer 13 is constructed by bonding the light transmission resin film made of a suitable material such as polycarbonate with an adhesive layer, for example, laminated thereon to the protective film 14 through the adhesive layer.

According to the arrangement in which the protective film 14 is formed on the optical recording layer as seen in this embodiment, even when the optical recording layer is heated at high temperature with irradiation of light to form the recording marks, the existence of the protective film 14 can suppress the recording and reproducing characteristics from being deteriorated due to the increase of noise caused by the denatured light transmission layer 13.

Next, an optical disc manufacturing method according to this embodiment will be described.

First, as shown in FIG. 4(a), according to the procedure described in the first embodiment, there is formed the disc substrate 11 with the concave and convex shape including the concave portion 11r for dividing the track area formed on the surface thereof.

Next, after dusts have been removed from this disc substrate 11 on its concave and convex shape formed surface by blasting gas such as air and nitrogen gas onto the above surface, the optical recording layer 12 of the mixture of Pd mixed into the above-mentioned composition consisting of the compound of tin, nitrogen and oxygen is formed by a suitable method such as a sputtering method as shown in FIG. 4(b).

Next, as shown in FIG. 5(a), silicon oxide is deposited by a suitable method such as a sputtering method to thereby form the protective film 14.

Thereafter, as shown in FIG. 5(b), the light transmission layer 13 is formed by bonding the light transmission resin film made of a suitable material such as polycarbonate onto the protective film 14 with the adhesive layer.

In this manner, the optical disc having the arrangement shown in FIG. 3, that is, optical recording medium can be manufactured.

The above-mentioned optical recording medium formed of the optical recording layer with Pd mixed thereto according to the present invention will be described with reference to specific inventive examples.

Inventive Example 5

There was formed a disc substrate with a concave and convex shape to divide a track area formed on its surface. The concave and convex shape was a continuous groove formed like a spiral at a pitch of 0.32 μm, and the concave and convex shape had a depth of 20 nm. A composition of $(Sn_xN_yO_z)_{1-a}Pd_a$ (x=31 atomic %, y=10 atomic %, z=59 atomic %, a=1 atomic %) having a thickness of 50 nm was deposited on the disc substrate at its concave and convex shape formed surface by sputtering so as to satisfy this composition ratio to thereby form an optical recording layer. Further, a protective film was formed by depositing silicon oxide having a thickness of 30 nm on the optical recording layer, and a light transmission layer having a thickness of 0.1 mm was formed by bonding a light transmission resin film made of a suitable material such as polycarbonate onto the protective film with an adhesive layer. In this manner, an optical disc sample K was manufactured.

A random signal with a bit length of 0.13 μm was recorded on this sample K with irradiation of recording and reproducing laser light having a wavelength of 405 nm from an objective lens having a numerical aperture of 0.85 by a test system having an optical system for focusing light on the optical recording layer of the optical disc.

Jitter of the signal that has been recorded on the optical disc was 8%.

A change of transmittance obtained after the sample K has been kept at temperature of 80° C. with relative humidity of 85% for 100 hours was less than 1%.

Comparative Example 7

This comparative example had a similar arrangement to that of the inventive example 5 but the composition of the optical recording layer was changed to $(Sn_xN_yO_z)_{1-a}Pd_a$ (x=31 atomic %, y=10 atomic %, z=59 atomic %, a=0.9 atomic %) and an optical disc sample L was manufactured.

A random signal having a bit length of 0.13 μm was recorded on this sample L by the test system described in the inventive example 5. Jitter obtained at that time was 10%.

Inventive Example 6

This inventive example had a similar arrangement to that of the inventive example 5 but the composition of the optical recording layer was changed to $(Sn_xN_yO_z)_{1-a}Pd_a$ (x=31 atomic %, y=10 atomic %, z=59 atomic %, a=20 atomic %) and an optical disc sample M was manufactured.

A random signal having a bit length of 0.13 μm was recorded on this sample M by the test system described in the inventive example 5. Jitter obtained at that time was 9%.

A change of transmittance obtained after the sample M has been kept at temperature of 80° C. with relative humidity of 85% for 100 hours was less than 1%.

Comparative Example 8

This comparative example had a similar arrangement to that of the inventive example 5 but the composition of the optical recording layer was changed to $(Sn_xN_yO_z)_{1-a}Pd_a$ (x=31 atomic %, y=10 atomic %, z=59 atomic %, a=21 atomic %) and an optical disc sample N was manufactured.

A random signal having a bit length of 0.13 μm was recorded on this sample N by the test system described in the inventive example 5. Jitter obtained at that time was 16%.

As is clear from the measured results of jitters of the above-mentioned samples K, M of the present invention and the samples L, N of the comparative examples, it is to be understood that the optical recording medium in which the optical recording layer according to the present invention is composed of the compound of tin (Sn), nitrogen (N) and oxygen (O) with Pd mixed thereto can improve jitter and resistance against high temperature and high humidity.

It is needless to say that the optical recording medium according to the present invention is not limited to the above-mentioned embodiments and inventive examples and that the arrangement of the present invention can be modified and changed in various points such as shapes of optical memory card, optical memory sheet and structures of layers of laminating layer.

As described above, according to the optical recording medium of the present invention, since the compound composition comprising the optical recording layer is selected to be $Sn_xN_yO_z$ and 30<x<70 (atomic %), 1<y<20 (atomic %) and 20<z<60 (atomic %) are satisfied, the problems of jitter caused when information is recorded on the recording medium using tin as the recording medium as mentioned in the preamble is irradiated with laser light having a short wavelength by an objective lens with a large numerical aperture can be solved.

Further, in the optical recording medium according to the present invention, since Pd is mixed into the compound $Sn_xN_yO_z$ comprising the optical recording layer, viscosity obtained when the recording layer is fused with irradiation of laser light can be increased and fluctuations of position and shape of the recording mark can be suppressed, the optical recording medium can increase recording density. Specifically, even when the numerical aperture of the objective lens is increased and the wavelength of the irradiated laser light is reduced in order to increase the storage capacity, the jitter can be suppressed. Moreover, the recording characteristic obtained under high temperature and high humidity can be improved, and hence the optical recording medium having more excellent recording characteristic can be constructed.

As described above, according to the arrangement of the present invention, there can be achieved a large effect in which a large-storage optical recording medium with excellent recording characteristics can be obtained.

The invention claimed is:

1. An optical recording medium comprising a structure with a concave and convex shape, at least an optical recording layer formed over a surface of the structure in which said concave and convex shape is formed, and a light transmission layer formed over said optical recording layer,
wherein said optical recording layer is comprised of a composition $Sn_xN_yO_z$ (x, y, z are atomic %) of a compound of at least tin (Sn), nitrogen (N) and oxygen (O), x, y, z being selected so as to satisfy 30<x<70 (atomic %), 1<y<20 (atomic %) and 20<z<60 (atomic %).

2. An optical recording medium comprising a with a concave and convex shape, at least an optical recording layer formed over a surface of the structure in which said concave and convex shape is formed, and a light transmission layer formed over said optical recording layer,
wherein said optical recording layer is comprised of composition $(Sn_xN_yO_z)_{1-a}Pd_a$ (x, y, z, a are atomic %) containing palladium (Pd) in a compound of tin (Sn), nitrogen (N) and oxygen (O), x, y, z, a being selected so as to satisfy 30<x<70 (atomic %), 1<y<20 (atomic %), 20<z<60 (atomic %) and 1<a<20 (atomic %).

3. The optical recording medium according to claim 1 or 2, wherein when said optical recording layer is irradiated with focused light having a wavelength ranging from 380 nm to 420 nm, information is recorded on said optical recording layer or recorded information is reproduced from said optical recording layer.

4. The optical recording medium according to claim 1 or 2, wherein when said optical recording layer is irradiated with focused light having a wavelength ranging from 380 nm to 420 nm by an objective lens having a numerical aperture of 0.85+−.0.05, information is recorded on said optical recording layer or recorded information is reproduced from said optical recording layer.

5. The optical recording medium according to claim 1 or 2, wherein said optical recording layer and said light transmission layer have a protective film interposed therebetween to protect said optical recording layer.

6. The optical recording medium according to claim 1, wherein said optical recording layer does not contain antimony (Sb) or hydrogen (H).

7. The optical recording medium according to claim 2, wherein said optical recording layer does not contain antimony (Sb) or hydrogen (H).

8. The optical recording medium according to claim 1, wherein said optical recording layer has a thickness of 30 nm to 60 nm.

9. The optical recording medium according to claim 2, wherein said optical recording layer has a thickness of 30 nm to 60 nm.

10. The optical recording medium according to claim 1, wherein said optical recording layer and said light transmission layer have a protective film interposed therebetween to protect said optical recording layer, the protective film having a thickness of 5 nm to 100 nm.

11. The optical recording medium according to claim 2, wherein said optical recording layer and said light transmission layer have a protective film interposed therebetween to protect said optical recording layer, the protective film having a thickness of 5 nm to 100 nm.

12. The optical recording medium according to claim 1, wherein x is substantially 31, y is substantially 10, and z is substantially 59.

13. The optical recording medium according to claim 2, wherein x is substantially 31, y is substantially 10, z is substantially 59, and a is substantially 1.

14. The optical recording medium according to claim 1, wherein said optical recording layer consists of the composition $Sn_xN_yO_z$.

15. The optical recording medium according to claim 2, wherein said optical recording layer consists of the composition $Sn_xN_yO_z$.

* * * * *